(12) United States Patent
Fraguela Yanez et al.

(10) Patent No.: US 11,130,085 B2
(45) Date of Patent: Sep. 28, 2021

(54) LIQUID SEPARATOR

(71) Applicant: ATLAS COPCO AIRPOWER, NAAMLOZE VENNOOTSCHAP, Wilrijk (BE)

(72) Inventors: Pablo Manuel Fraguela Yanez, Wilrijk (BE); Elisabeth Anika Simon Rabaey, Wilrijk (BE); Tom Andre Jenny Potters, Wilrijk (BE); Viktor Maurits Ingrid Vriens, Wilrijk (BE); Karen Anna Leon Marien, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 198 days.

(21) Appl. No.: 16/336,948

(22) PCT Filed: Oct. 9, 2017

(86) PCT No.: PCT/IB2017/056219
§ 371 (c)(1),
(2) Date: Mar. 27, 2019

(87) PCT Pub. No.: WO2018/069812
PCT Pub. Date: Apr. 19, 2018

(65) Prior Publication Data
US 2019/0262752 A1    Aug. 29, 2019

(30) Foreign Application Priority Data

Oct. 11, 2016    (BE) .................................. 2016/5762

(51) Int. Cl.
*B01D 50/00* (2006.01)
*B01D 45/16* (2006.01)
(Continued)

(52) U.S. Cl.
CPC ............. *B01D 45/16* (2013.01); *B01D 45/08* (2013.01); *B01D 45/12* (2013.01); *B04C 3/04* (2013.01);
(Continued)

(58) Field of Classification Search
CPC ................ B01D 45/16; B01D 2313/20; B01D 2313/21; B01D 45/08; B01D 50/002;
(Continued)

(56) References Cited

U.S. PATENT DOCUMENTS 3,129,173 A * 4/1964 Schulze .................... B04C 5/04
                                                    210/512.1
3,470,678 A * 10/1969 Schumacher ............. B04C 5/20
                                                    55/434.1
(Continued)

FOREIGN PATENT DOCUMENTS

CN    201940295 U    8/2011
CN    102380262 A    3/2012
(Continued)

OTHER PUBLICATIONS

International Search Report in related PCT Application No. PCT/IB2017/056219, dated Feb. 8, 2018.
(Continued)

*Primary Examiner* — Dung H Bui
(74) *Attorney, Agent, or Firm* — Bacon & Thomas, PLLC

(57) ABSTRACT

Liquid separator provided with a housing which includes an at least partially cylindrical wall defining a separation chamber, closed at one end by a base and at the other end by a lid in which there is a gas outlet for the discharge of the treated gas. A shield is provided in the separation chamber surrounding the gas outlet in the separation chamber from the aforementioned lid. The liquid separator has an inlet for a liquid-gas mixture to be treated. The inlet is located in the lid
(Continued)

so that the liquid-gas mixture tangentially enters the separation chamber in the space between the wall and the shield.

20 Claims, 7 Drawing Sheets

(51) Int. Cl.
  *B04C 3/04*  (2006.01)
  *B04C 3/06*  (2006.01)
  *B01D 45/12*  (2006.01)
  *B01D 45/08*  (2006.01)
  *B04C 3/00*  (2006.01)
  *B04C 5/13*  (2006.01)
(52) U.S. Cl.
  CPC .............. *B04C 3/06* (2013.01); *B01D 50/002* (2013.01); *B01D 2313/20* (2013.01); *B01D 2313/21* (2013.01); *B04C 5/13* (2013.01); *B04C 2003/006* (2013.01)
(58) Field of Classification Search
  CPC .. B01D 45/12; B04C 3/04; B04C 3/06; B04C 2003/006; B04C 5/081; B04C 5/13
  See application file for complete search history.

(56) References Cited

U.S. PATENT DOCUMENTS

| | | | | |
|---|---|---|---|---|
| 3,513,642 | A * | 5/1970 | Cornett | B01D 50/00 55/399 |
| 3,850,816 | A * | 11/1974 | Koch | B04C 5/081 210/512.1 |
| 4,113,450 | A * | 9/1978 | Goransson | B01D 53/26 95/19 |
| 4,226,707 | A | 10/1980 | Boivin | |
| 4,406,677 | A * | 9/1983 | Obermeier | B01D 45/12 209/710 |
| 4,668,256 | A | 5/1987 | Billiet et al. | |
| 4,762,469 | A * | 8/1988 | Tischer | F04C 28/28 417/279 |
| 4,908,049 | A * | 3/1990 | Yoshida | B04C 5/081 209/11 |
| 5,525,396 | A * | 6/1996 | Rudolph | A47L 9/102 428/131 |
| 5,758,796 | A | 6/1998 | Nishimura et al. | |
| 6,027,541 | A * | 2/2000 | Siemers | B01D 45/16 55/429 |
| 6,210,457 | B1 * | 4/2001 | Siemers | B01D 45/16 55/429 |
| 6,398,834 | B2 * | 6/2002 | Oh | A47L 9/1683 55/424 |
| 6,752,845 | B2 * | 6/2004 | Haland | B01D 45/16 55/340 |
| D495,347 | S * | 8/2004 | Erbach | D15/138 |
| 8,864,863 | B1 * | 10/2014 | Kerbs | B01D 45/06 55/322 |
| 10,857,550 | B2 * | 12/2020 | Huntley | A47L 9/1658 |
| 2003/0221996 | A1 * | 12/2003 | Svoronos | B04C 9/00 209/1 |
| 2004/0184941 | A1 * | 9/2004 | Aoki | F01C 21/007 418/84 |
| 2006/0196220 | A1 * | 9/2006 | Westermeyer | F25B 43/02 62/470 |
| 2007/0044437 | A1 * | 3/2007 | Larnholm | B01D 45/16 55/319 |
| 2008/0251469 | A1 | 10/2008 | Tee et al. | |
| 2009/0288560 | A1 * | 11/2009 | Ruppel | F01M 13/04 96/408 |
| 2010/0218466 | A1 * | 9/2010 | Lloyd | B01D 50/002 55/337 |
| 2011/0233126 | A1 | 9/2011 | Prouty et al. | |
| 2011/0296648 | A1 * | 12/2011 | Kah, Jr. | B04C 5/04 15/353 |
| 2012/0055125 | A1 * | 3/2012 | Manska | A47L 7/0071 55/394 |
| 2013/0091815 | A1 * | 4/2013 | Smith | A47L 9/106 55/346 |
| 2013/0129548 | A1 * | 5/2013 | Wu | F04C 29/028 418/9 |
| 2013/0139481 | A1 * | 6/2013 | Sakai | B04C 5/04 55/396 |
| 2014/0116256 | A1 * | 5/2014 | Yamasaki | B01D 45/16 96/414 |
| 2016/0167128 | A1 * | 6/2016 | Stalder | B01D 50/002 164/76.1 |
| 2016/0184837 | A1 * | 6/2016 | Trench | B04C 5/085 55/461 |
| 2017/0248354 | A1 * | 8/2017 | Lord | F28D 1/0461 |
| 2017/0312764 | A1 * | 11/2017 | Robert | B04C 5/14 |
| 2018/0056211 | A1 * | 3/2018 | Seabrook | B04C 9/00 |
| 2018/0058452 | A1 * | 3/2018 | Yuki | F04C 29/12 |
| 2019/0275532 | A1 * | 9/2019 | Grimm | B03B 9/00 |

FOREIGN PATENT DOCUMENTS

| | | |
|---|---|---|
| CN | 103418215 A | 12/2013 |
| CN | 203935711 U | 11/2014 |
| DE | 3541370 A1 | 5/1986 |
| EP | 0736318 A3 | 10/1996 |
| EP | 1795753 A1 | 6/2007 |
| EP | 2990123 A1 | 3/2016 |
| GA | 1091202 A | 12/1980 |
| GN | 1938100 A | 3/2007 |
| JP | H09-96399 | 4/1997 |
| KR | 2012-0008124 | 1/2012 |
| SU | 520136 A1 | 7/1976 |
| SU | 1567282 A1 | 5/1990 |
| WO | 2005089950 A1 | 9/2005 |
| WO | 2010104491 A1 | 9/2010 |
| WO | 2012167180 A2 | 12/2012 |

OTHER PUBLICATIONS

Written Opinion in related PCT Application No. PCT/IB2017/056219, dated Feb. 8, 2018.

* cited by examiner

LIQUID SEPARATOR

More specifically, the invention is intended for separating liquid, such as for example water, from compressed gas from a compressor.

BACKGROUND OF THE INVENTION

Oil-injected compressors are already known, with oil being injected into the rotor chamber for lubrication, sealing and cooling. As a consequence, the compressed air will contain oil.

However, for the pharmaceutical industry, the paint industry and in food related and electronics applications it is necessary to provide oil-free compressed air.

Therefore, filters are provided after the compressor element to filter the oil out of the air.

However, these filters will never remove all of the oil out of the air, so that this air cannot be used in critical or highly demanding applications in the aforesaid sectors, as even the smallest amount of oil in pharmaceutical, paint, electronics or food applications makes the products unusable and everything must be destroyed.

In addition, there is a risk of failure of these filters, which will cause oil to contaminate the air and consequently the applications or devices using this air, with all resulting detrimental effects.

Oil-free compressors are also known, in which no oil is injected so as to provide a 100% oil-free compressed air. A disadvantage is that, due to the lack of cooling, the gas temperature rises very high, thus requiring additional cooling.

Water-injected compressors are also known, with water being injected into the compressor element for cooling, lubrication and sealing.

These have the advantage that there is no risk of oil contamination in applications in the pharmaceutical, electronics, paint or food sectors.

In order to be able to remove the water from the compressed air, a liquid separator is used, which is provided with a housing comprising an at least partially cylindrical wall, defining a separation chamber, that is closed at one end by means of a base and at the other end by means of a lid in which there is a gas outlet for the discharge of the treated gas, wherein a shield is provided in the aforementioned separation chamber that extends around the aforementioned gas outlet in the aforementioned separation chamber from the aforesaid lid.

The housing of the liquid separator is further provided with a tangentially positioned inlet for a liquid-gas mixture to be treated, which can be connected to the compressor element outlet.

In such known liquid separators, which are also referred to as centrifugal separators and which are used, for example, for separating oil or water from pressurized air, the liquid-gas mixture will be purified by the presence of heavier liquid particles being driven or projected against the walls of the housing by the centrifugal forces caused by the cyclonic flow of the mixture, created by the tangentially positioned inlet in the cylindrical wall of the housing.

The shield will prevent the mixture from leaving the separation chamber directly through the outlet without passing through the cyclonic flow.

However, to avoid problems with rust and the like, the water separator is often made of stainless steel, also called inox, which makes the water separator and thus the compressor very expensive and heavy.

Therefore, in the industry, the cheaper solution of an oil-injected compressor with or without filters is often used with the risk of oil pollution of the compressed air.

SUMMARY OF THE INVENTION

It is the object of the present invention to provide a solution to at least one of the aforementioned and other drawbacks by providing a cheap and light liquid separator that can be used in water-injected compressors to allow oil-free compressed air to be generated with a cheaper machine.

It is clear that a liquid separator according to the present invention may also be used in other machines.

The present invention relates to a liquid separator which is provided with a housing comprising an at least partially cylindrical wall defining a separation chamber, closed at one end by means of a base and at the other end by means of a lid, in which a gas outlet is provided for the discharge of the treated gas, wherein a shield is provided in the aforementioned separation chamber which extends around the aforementioned gas outlet in the aforementioned separation chamber from the aforesaid lid, the liquid separator being provided with an inlet for a liquid-gas mixture to be treated, the inlet being located in the aforementioned lid so that the liquid-gas mixture tangentially enters the separation chamber in the space between the aforementioned wall and the shield and in that the housing wall is made up of a sleeve around which a composite is fitted or wound, in that the outer diameter of the afore-mentioned lid is smaller than the outer diameter of the cylindrical wall of the housing and/or the outer diameter of the afore-mentioned base is smaller than the outer diameter of the cylindrical wall of the housing and in that the composite is fitted at least partly over or around the aforementioned lid and base.

An advantage is that by providing the inlet in the lid, it is no longer necessary to provide the inlet in the housing wall, which is detrimental to the strength of this wall.

This opens up the possibility of using materials other than stainless steel for the housing without there being a risk that a tangentially placed inlet in the wall will weaken the housing.

Another advantage is that by designing the inlet thus that the liquid-gas mixture is tangentially entering the separation chamber, in the space between the wall and the shield, the liquid-gas mixture will follow a cyclonic path around the shield, along the wall.

As a result, the separation of the liquid particles or liquid droplets present in the mixture will efficiently occur by their deposition against the wall.

Moreover, because the composite is applied over or around the lid and/or the base, a strong connection is realised between the cylindrical wall and the lid and/or the base.

The fitting or wounding of the composite around the sleeve can be done for example with a technique which is called "filament winding" in English.

The sleeve wan be made out of a plastic or polymer such as for example PE, HDPE, LDPE, PET or a fluopolymer. This sleeve can be prefabricated with for example "blow moulding", "rotation moulding" or by wrapping one or more layers with or without welding and/or gluing to form a sleeve. It is not excluded that another material is used for this sleeve. Also a textile or a so called non-woven can be wrapped and impregnated with a resin to form this sleeve.

Such a sleeve is also called a "liner" in English.

The composite can be made our of glass fibre, aramid, carbon fibre or basalt fibre in a matrix of epoxy resin, polyester resin, vinyl resin or similar. A composite has as an advantage that it is light, strong and not sensitive to corrosion.

Such a structure of the housing, consisting of a sleeve whereby a composite is fitted or wound around this sleeve, has the advantage of drastically reducing the weight of the liquid separator.

By providing the inlet in the lid, no opening must be made in the composite to realize such an inlet, thus ensuring the strength of the composite.

Another advantage is that by using the sleeve around which the composite is wrapped, a smooth inner wall can be provided, so that the water particles deposited against this wall can readily drop to the base of the liquid separator, to be discharged by a drain for the separated liquid.

In addition, this sleeve can also ensure the gas tightness of the housing.

In a further improved embodiment, the periphery of the lid and/or the base is provided with one or more surface irregularities. This has the advantage that by the application of the composite in or over these irregularities a non-rotational connection can be realised between the composite of the cylindrical wall and the lid and/or the base.

In a second practical embodiment, the outer diameter of the lid is smaller than the inner diameter of the cylindrical wall of the housing at the end and/or the outer diameter of the base is smaller than the inner diameter of the cylindrical wall at the end.

Specifically in this embodiment, the lid and/or the base is attached in the housing with one or more retaining rings, which exist out of one or more parts and which are placed in grooves at the inside of the end of the cylindrical wall of the housing. This has the advantage that the lid and/or the base can be mounted in the housing in a simple and fast way. Moreover, the lid and/or base can be disassembled in a simple and fast way as well, which allows for the inspection and possible cleaning of the liquid separator.

More specifically, the lid and/or base can be fixed as is known to fix a so-called endcap in a reverse osmosis pressure vessel, for example in a similar way as described in US 2011/233.126.

Both in the first as well as in the second embodiment, a sealing can be provided between the base and the sleeve and/or between the lid and the sleeve. For example, an O-ring can be applied as a sealing.

Both in the first as well as in the second embodiment, the lid and/or the base can be made of anodised aluminium. Note that also other stainless metals are suitable, such as stainless steel or bronze alloys.

In further a practical embodiment of the first or second practical embodiment, the inlet is designed as a duct in and through the lid, where preferably the cross section of the duct, seen in the flow direction of the liquid-gas mixture, gradually changes from mostly circular to D-shaped and then passes to C-shaped, the opening of the C-shape facing the sleeve and the duct being bent at least at the C-shaped cross-section and following the shape of the housing.

This has the advantage that the circular inlet makes it easy to connect the outlet of a compressor or other inlet conduit of a liquid-gas mixture.

The curved shape of the duct will ensure that the liquid-gas mixture enters the separation chamber following a cyclonic flow path, so that cyclone separation can be performed optimally. The liquid-gas mixture will, as it were, be projected against the sleeve.

In addition, the C-shape at the end of the duct will ensure that the liquid particles of the liquid-gas mixture can come into contact with the wall and can be separated upon entering the separation chamber.

After all, as soon as liquid particles have touched the wall, they can readily drop to the base of the liquid separator, to be discharged by a drain for the separated liquid.

Liquid particles deposited against the walls of the duct, on the other hand, will be carried away from the duct by the flow of the liquid-gas mixture and return to the mixture.

In a further practical embodiment, the duct is curved according to an opening spiral, as seen in the flow direction of the liquid-gas mixture.

In a preferential embodiment the gas outlet is placed centrally in the lid.

In the housing of the liquid separator, a demister or droplet separator can be further provided. In this way, a part of the fluid particles in the gas flow that are not projected against the inner wall of the housing can be captured. It is well known that several materials, such as for example open foams, can be used for this purpose.

In a further practical embodiment, the fluid separator is provided with means to determine the level of the fluid in the housing. This can be in the form of a sensor which is placed centrally in the housing or at the inner wall of the housing. Alternatively, a measuring tube or oil gauge can be placed outside the housing, whereby one end is connected with a passage in the base and the other end is connected with a passage in the lid.

The base can be further provided with supports or legs or similar to be able to mount the fluid separator on a chassis, a surface or on a compressor installation.

The liquid separator can be further provided with a pressure relieve valve, which is preferably mounted on the lid or on the base.

The liquid separator can be further provided with a minimum pressure valve, which is preferably mounted on the lid.

Further, the liquid separator can be a part of a compressor installation, whereby the inlet of the liquid separator is connected with the outlet of the compressor element. The liquid separator can be a liquid separator for separating water from air, in particular as part of a so-called water injected compressor installation, whereby the inlet of the fluid separator is connected to the outlet of the water injected compressor element.

BRIEF DESCRIPTION OF THE DRAWINGS

With the intention of better showing the characteristics of the invention, some preferred variants of a liquid separator according to the present invention are described hereinafter by way of an example, without any limiting nature, with reference to the accompanying drawings, wherein.

DETAILED DESCRIPTION OF THE INVENTION

Figure 1:
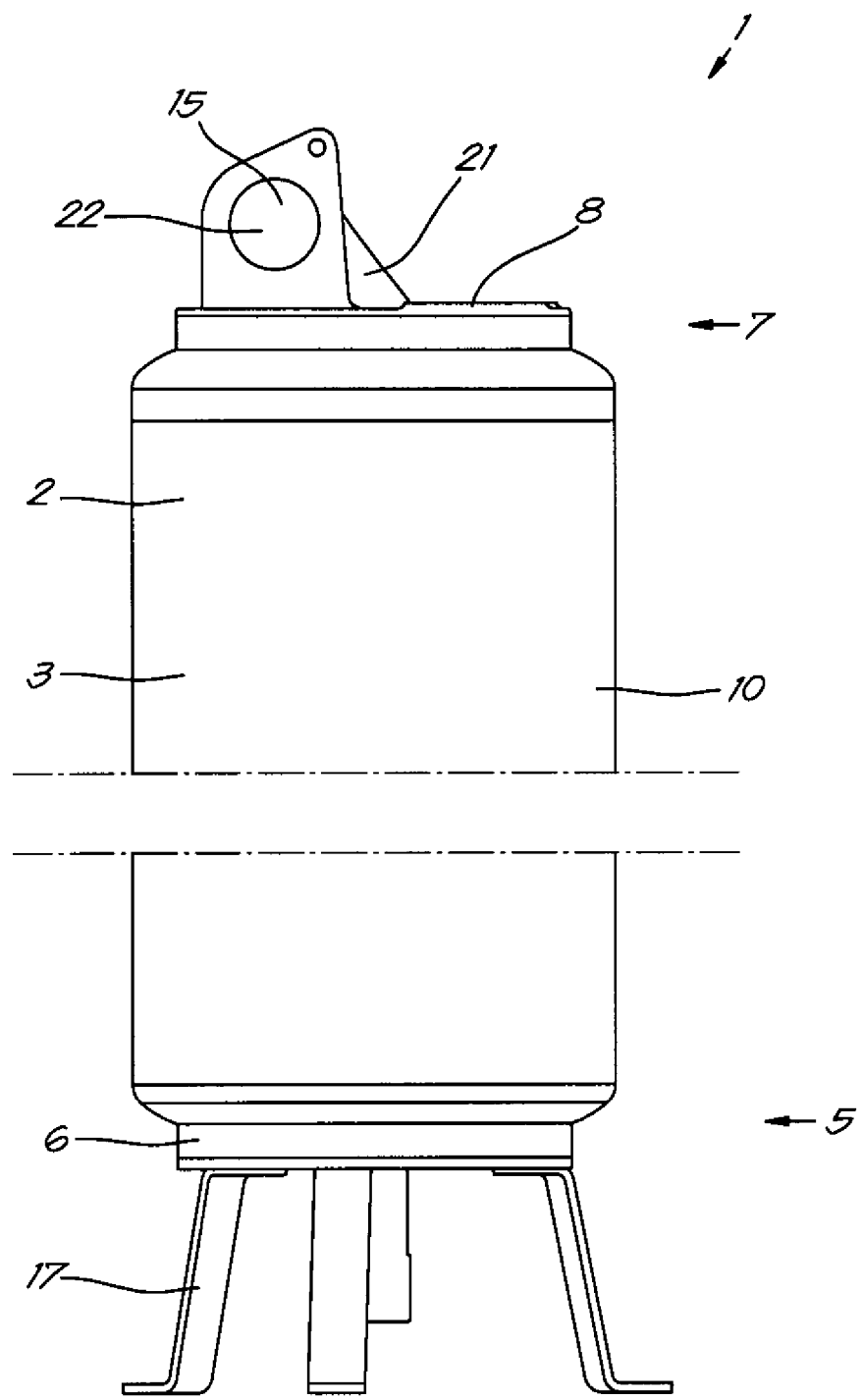
FIG. 1 schematically represents a liquid separator according to an embodiment of the present invention.
Figure 2:
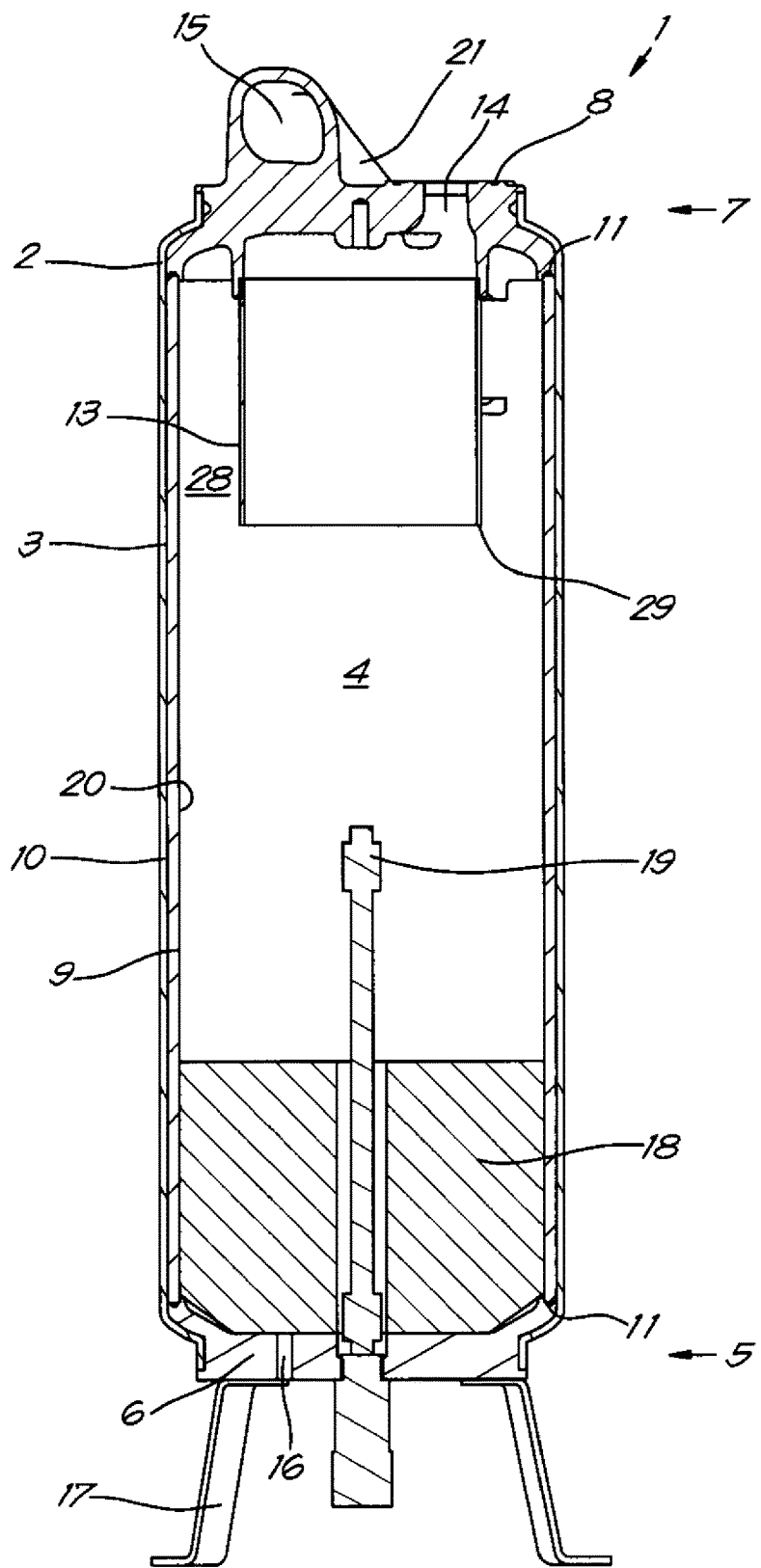
FIG. 2 schematically represents a vertical section of the liquid separator of FIG. 1.

The liquid separator 1 according to the invention as schematically represented in FIGS. 1 and 2 primarily comprises a housing 2 which consists of an at least partially cylindrical wall 3 defining a separation chamber 4 which is closed at one end, the bottom side 5, by means of a base 6 and at the other end, the top side 7, by means of a lid 8.

As shown in the example shown in FIG. 2, the wall 3 of the housing 2 is made up of a sleeve 9, around which a composite 10 is fitted or wrapped.

The sleeve 9 is made up of a plastic or polymer such as, for example, HDPE, yet it is not excluded that another material is used.

The composite 10 is made up of glass fiber, aramid or carbon fiber in an epoxy resin matrix or the like.

In this case, both the base 6 and the lid 8 are made of anodized aluminum. That material is cheaper and lighter than, for example, stainless steel.

To ensure a good sealing, seals 11 are provided between the base 6 and the lid 8 on the one hand and the sleeve 9 on the other hand.

Figure 3:
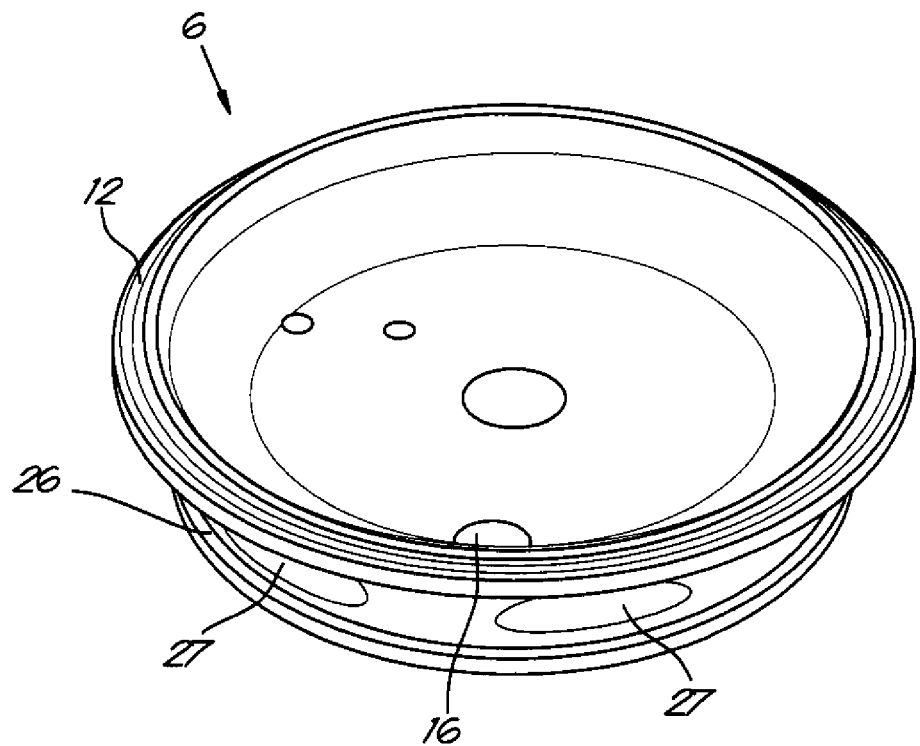
FIGS. 3 and 4 schematically represent the base of the liquid separator of FIGS. 1 and 2.

That is shown in FIG. 2, wherein in this embodiment an O-ring is used as seal 11, yet it is not excluded that another type of seal 11 can be used. FIG. 3 shows that this O-ring is provided in the base 6 with a groove 12 fitted for this purpose.

In the aforementioned separation chamber 4 a shield 13 is provided which extends from the aforementioned lid 8 and around a gas outlet 14 for treated gas provided in this lid 8.

The shield 13 in this case is constructed as a tube and in this case is made of HDPE.

The aforementioned gas outlet 14 is, in this case, but not necessarily, placed centrally in the lid 8.

The lid 8 according to the invention is also provided with an inlet 15 for a liquid-gas mixture to be treated.

Figure 4:
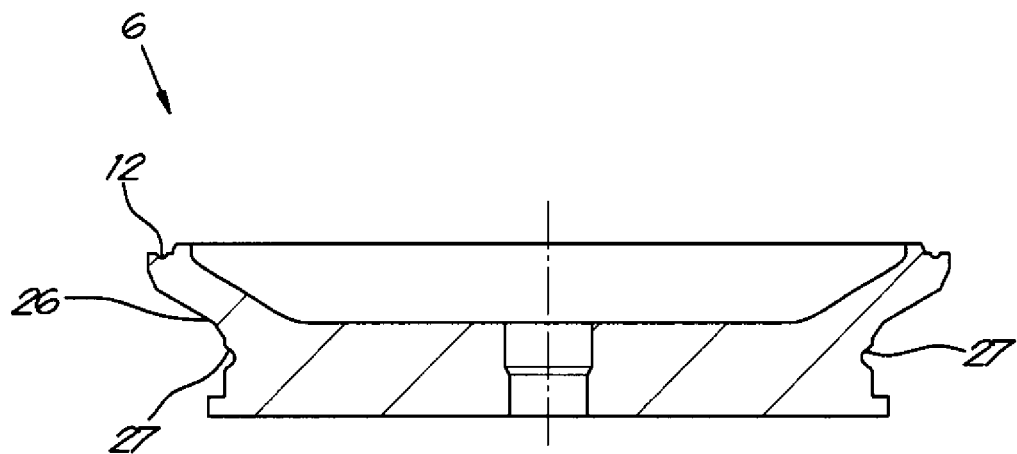

Also, a drain 16 for separated liquid is provided at the bottom side 5 in the base 6 as shown in FIGS. 3 and 4. It is not excluded that this drain 16 is located in the wall 3 of the housing 2 near the base 6.

The base 6 is equipped with aids 17 for attaching the liquid separator 1 to a surface or machine. In this case supports or legs, but it is clear that these aids 17 can be designed in different ways.

In addition, a demister 18 or droplet separator 18 is provided in the housing 2, which often consists of a spongy and/or soft material. This droplet separator 18 is provided at the bottom side 5 in the housing 2.

Also, the housing 2 is provided with controllers 19 for determining the level of the liquid in the housing 2.

In the example shown, these controllers 19 are designed in the form of a sensor located centrally in the housing 2.

However, it is not excluded that the sensor is placed on or against the inner wall 20 of the sleeve 9, for example.

In FIGS. 5 to 8, the lid 8 is shown in more detail. This lid 8 is placed on the top side 7 of the cylindrical wall 3, opposite the base 6.

The inlet 15 is formed as a duct 21 in and through the lid 8. The duct 21 will guide the liquid-gas mixture to be treated to and into the separation chamber 4.

In this case, the duct 21 is bent into an opening spiral when seen in the flow direction of the liquid-gas mixture.

In this manner, the liquid-gas mixture will enter the separation chamber 4 in a cyclone or vortex-shaped flow, so that the cyclone separation against the inner wall 20 of the sleeve 9 can be optimized.

Figure 5:
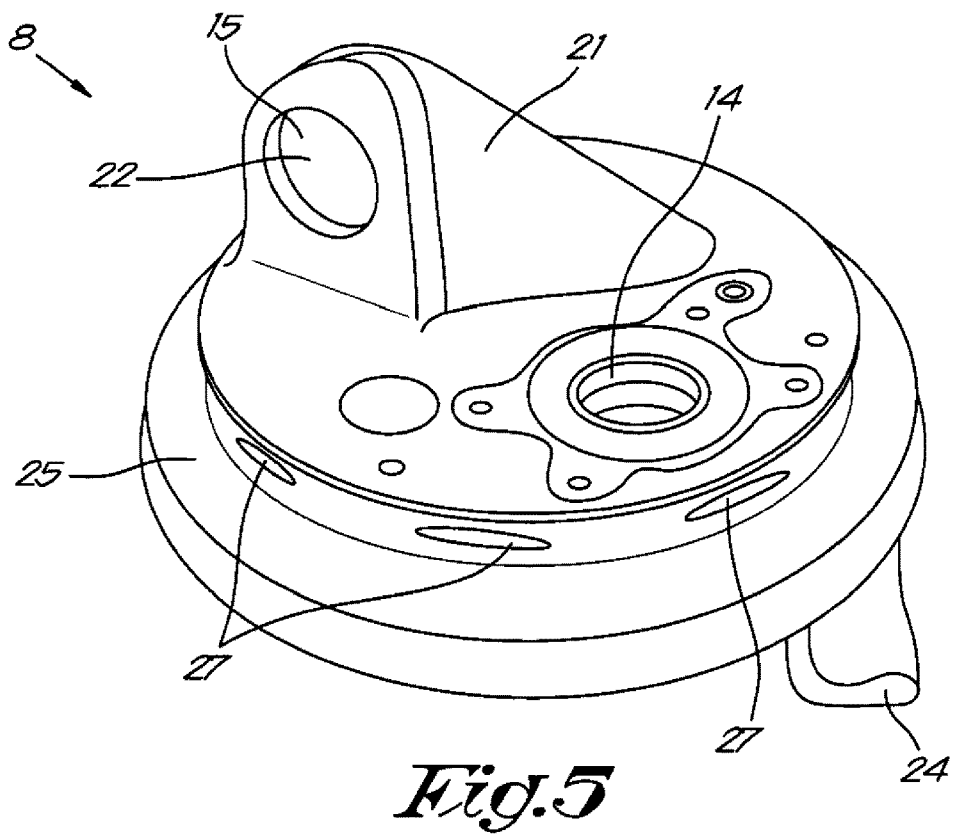
FIGS. 5 to 8 schematically represent different views and a sectional view of the liquid separator lid of FIGS. 1 and 2.

As can be seen in FIG. 5, a portion of the duct 21 is positioned as a conduit or tube on or against the lid 8. However, it is also possible that the lid 8 is made thicker and that the duct 21 is integrated in the lid 8.

Also, the shape of the cross section of the duct 21 is variable along the length of the duct 21.

Figure 6:
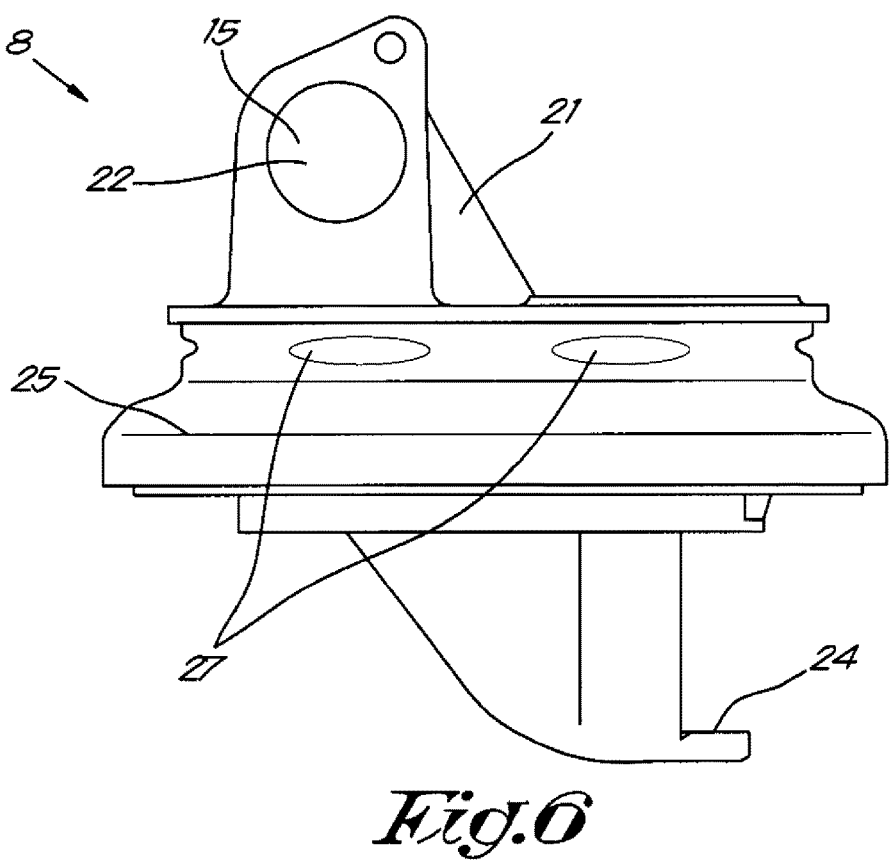
Figure 7:
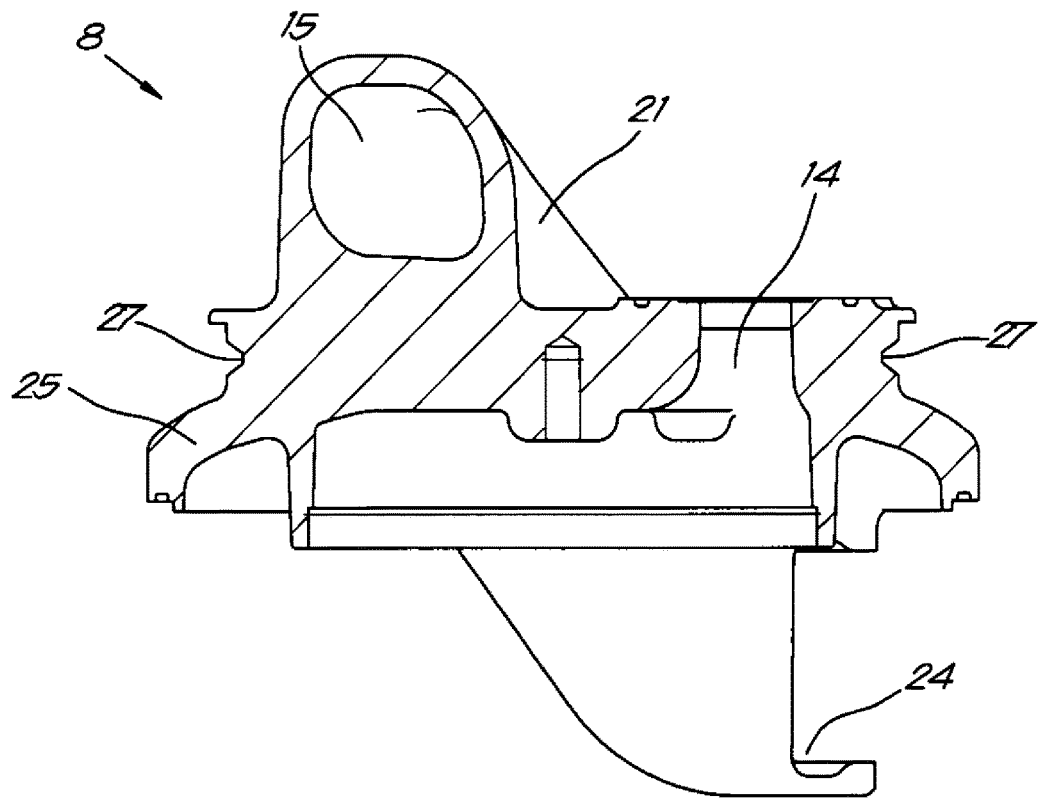
Figure 8:
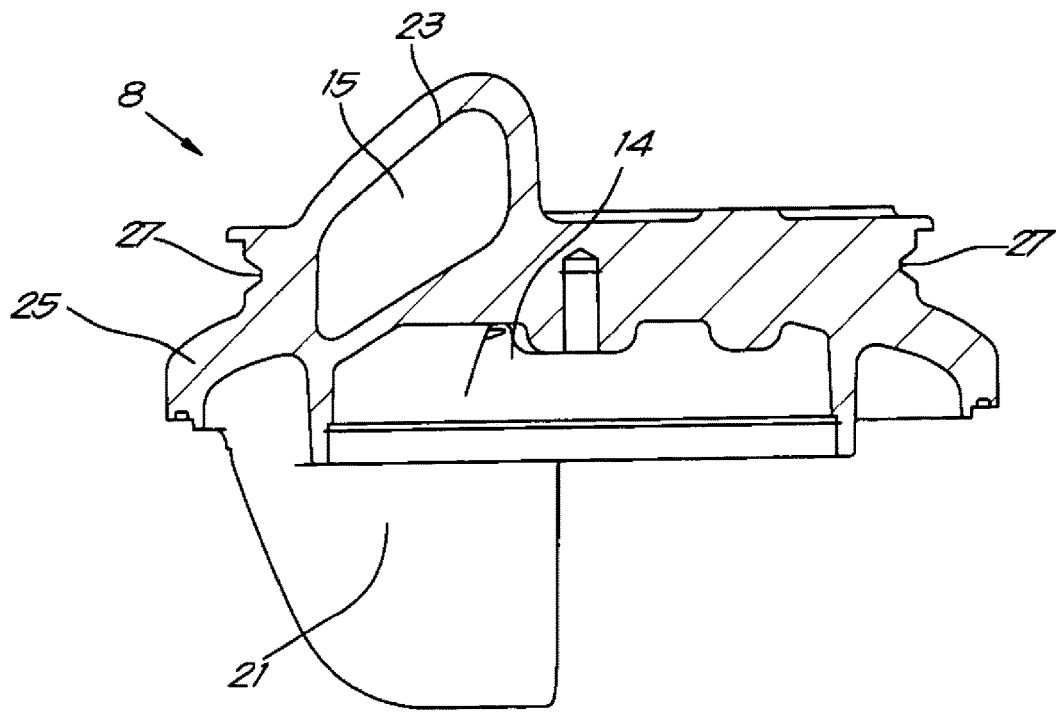

In this case, this cross-section, as viewed in the flow direction of the liquid-gas mixture through the duct 21, will gradually change from mostly circular (FIG. 6) to D-shaped (FIG. 8) and then proceed to being C-shaped (FIGS. 6 and 7).

The circular inlet 22 of the duct 21 will provide an easy connection to a conduit from, for example, a compressor.

In this case, C-shaped means that the duct will be open on one side. This means that the straight side 23 of the D-shape will be open at a certain location, i.e. the straight side 23 is omitted so that an open and C-shaped cross section is obtained.

The C-shaped cross section at the discharge 24 of the duct 21 will be angled so that the opening of the C-shape is directed towards the sleeve 9, whereby the duct 21 is bent or curved at the C-shaped cross-section and follows the shape of the housing 2 or the inner wall 20 of the sleeve 9.

Although in the illustrated example the duct 21 is bent along its full length, it is possible that the duct is only bent at the C-shaped cross-section.

In the illustrated example, the duct 21 has a C-shaped cross-section from the moment it enters in the separation chamber 4, that is, from the moment that a separation of the liquid-gas mixture can take place by deposition of liquid particles against the inner wall 20 of the sleeve 9. FIGS. 5 to 7 clearly show that one end of the duct, i.e. the discharge 24, is located on the side of the lid 8 facing the separation chamber 4 and that the other end of the duct, i.e. the inlet 22 is located on the side of the lid 8 which faces away from the separation chamber 4. In other words, neither the inlet 22 nor the discharge 24 are placed laterally.

As a result, the periphery 25 of the lid 8 is free of any passages.

This will have beneficial effects on the manufacture of a liquid separator 1 according to the invention.

After all, this opens up the possibility to fit the composite 10 at least partially over or around the lid 8. This is shown in FIG. 2.

By providing the possible drain 16 in the base 6 at a suitable location, the periphery 26 of the base 6 will also be free of any passages so that the composite 10 can also be fitted over or around the base 6.

This will result in the possibility that the composite 10 forming the housing can hold the base 6, the lid 8 and the sleeve 9 together without closing or blocking the inlet 15 or the drain 16.

In addition, the composite 10 will retain its strength as no passages in the composite 10 must be made. As shown in FIGS. 3 to 7, one or more surface units 27 are provided in the periphery 25, 26 of the lid 8 and the base 6.

In this case, these units are local recesses 27 in which the composite 10 is fitted, but it is also possible that these units are local protrusions on which the composite 10 is fitted.

This makes it possible to achieve a rotational connection between the composite 10 and the lid 8 and the base 6.

The composite 10 fitted in the local recesses 27 will stop or prevent a rotation of the lid 8 and the base 6 relative to the composite 10 and the sleeve 9.

In the example shown, six recesses 27 are provided along the periphery 25, 26 of the lid 8 and the base 6, but it is clear that the invention is not limited to this. In principle, one recess 27 would be sufficient, but the number is free to choose.

Of course, it is also possible that only the lid 8 or only the base 6 is provided with one or more surface units 27.

If the base 6 or the lid 8 are free of surface units 27, they may still be rotatable with respect to the sleeve 9 and the composite 10. This rotatability can be used when installing the liquid separator 1, enabling a final adjustment, so that, for example, all conduits can be easily connected to the liquid separator 1.

Figure 9:
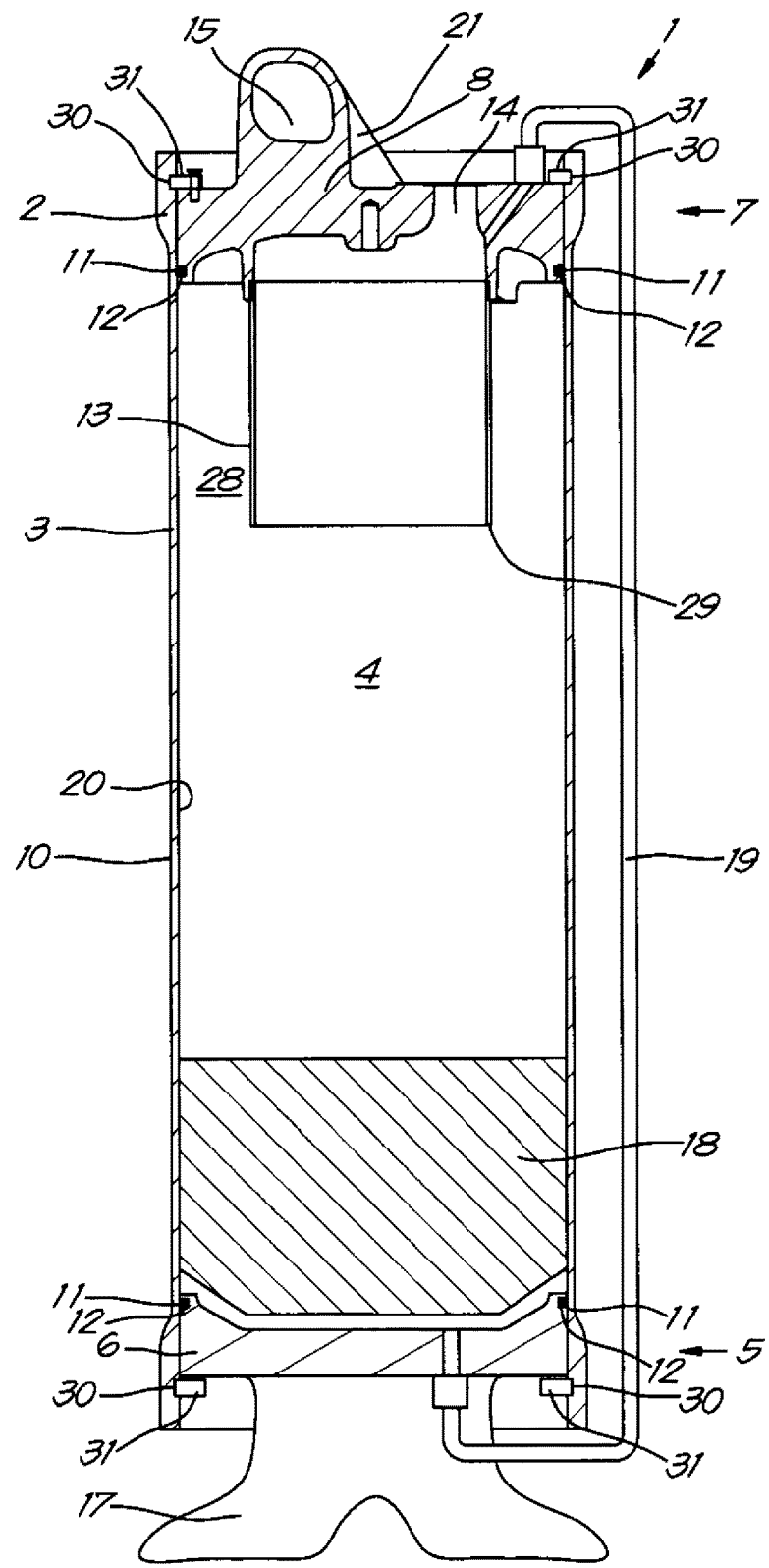
FIG. 9 schematically represents a liquid separator according to the invention with a housing similar as applied for reverse osmosis pressure vessels.

In FIG. 9 a fluid separator 1 is represented whereby the housing 2 comprises a wall 3 which is formed by a tube shaped pressure vessel as used for reverse osmosis, for example for the desalination of sea water. The wall 3 is made out of composite 10 preferably around a sleeve 9 (not shown in FIG. 9) on the inside. Within the fluid separator 1 there is a separation chamber 4. The base 6 is attached in the end 5 at the bottom and the lid 8 is attached in the end 7 at the top. For this purpose, ring shaped grooves 30 are provided at the inner side of both ends 5, 7 of the housing 2. The base 6 and the lid 8 are attached with retaining rings 31 which are mounted in these ring shaped grooves 30. It is possible that additional helping means are used to attach the retaining rings 31 to the base 6 and/or the lid 8, such as for example a bolt connection. The base 6 and the lid 8 are further provided with a groove in the perimeter in which seals 11 are provided. Further, means 19 are provided to determine the level, in this case an externally applied measuring tube, which is connected with the separation chamber 4 via a passage through the base 6 and a passage through the lid 8.

The operation of the liquid separator 1 is very simple and as follows.

The liquid-gas mixture comprising, for example, a water-air mixture from a water-injected compressor element is introduced into the separation chamber 4 of the liquid separator 1 at the top side 7 of the housing 2 via the inlet 15 into the space 28 between the wall 3 and the shield 13. Hereby the mixture will flow through the duct 21.

The liquid-gas mixture flows through this space 28 from top to bottom, i.e. from the lid to the base, with the liquid-gas mixture following the cylindrical wall 3 of the housing 2, because the duct 21 is bent in such a manner that the mixture flows tangentially into the separation chamber 4. During this movement, the mixture thus travels a distance which is several times greater than the circumference of the housing 2.

Due to the centrifugal forces, the heavier liquid particles of the mixture are projected against the wall 3 of the housing 2 more specifically against the inner wall 20 of the sleeve 9, so that these particles subsequently flow downwardly along this inner wall 20.

The liquid being separated is collected at the base of the housing 2.

When the mixture reaches the underside of the shield 13, it flows around the free end 29 of the shield 13 and then continues its way upward.

Because the mixture is forced to make a bend of 180°, the heavier liquid particles will maintain their downward movement due to their inertia. In this way a second separation phase takes place.

The demister 18 or droplet separator will cause the liquid particles to be trapped in its interior, so that the lightest fluid particles under the influence of the upward movement of the mixture are not being dragged by the mixture in the direction of the gas outlet 14.

When the mixture sets its way upwards, more than 99% of the water is separated.

It is not excluded that a fine filter is also provided which extends around the gas outlet 14 in the separation chamber 4 from the lid 8 and is surrounded by the shield 13 so that the mixture undergoes a third separation phase through this fine filter. In this way, up to 99.99% of the liquid can be extracted from the mixture.

The treated gas leaves the liquid separator 1 through the gas outlet 14 in the lid 8.

Subsequently, the gas can be used in an application placed downstream, for example in the case of compressed air, for compressed air applications.

The terms "base 6", "lid 8", "top side 7", "bottom side 5", "base" and "bottom" are always used in the light of the attached FIGS. 1 and 2. However, it is obvious that the liquid separator 1 according to the invention need not necessarily have a completely vertical setup, as shown in the figures, but that it can also be used in other positions.

Figure 10:
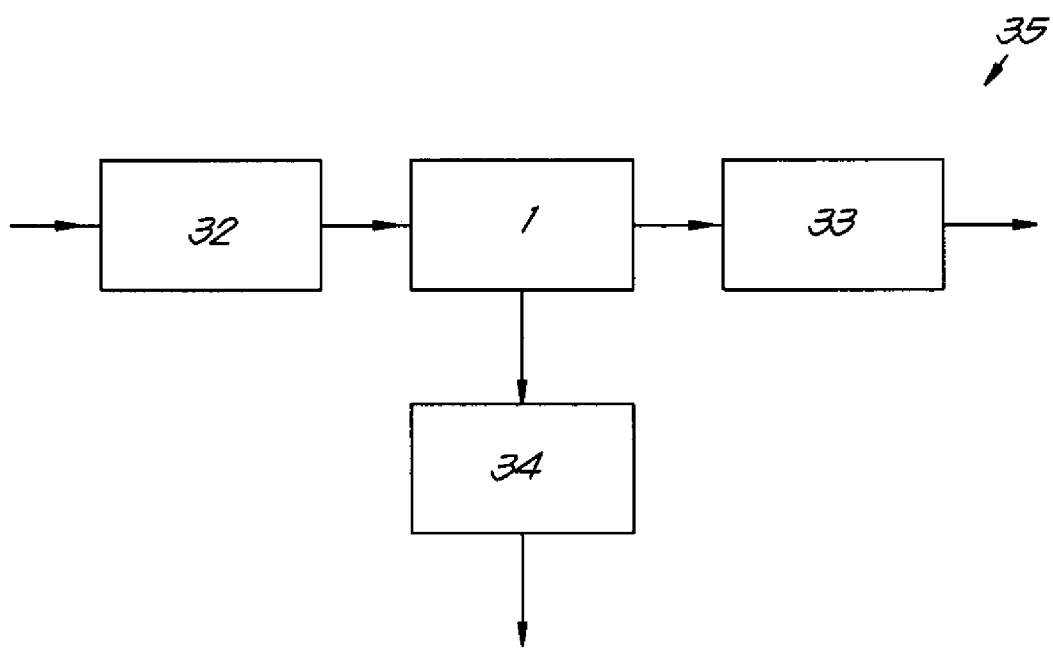
FIG. 10 schematically represents a part of a compressor installation which comprises a liquid separator according to the invention.

FIG. 10 schematically represents a part of a compressor installation 35 which comprises a liquid separator 1 according to the invention. The outlet of a water injected screw compressor element 32 is connected with the inlet of the liquid separator 1. In the liquid separator 1 a part of the water in the compressed air is removed by projecting it in the separation chamber 4 of the liquid separator 1. After passage through the liquid separator 1, the compressed gas, which is at least partially stripped of water, is guided via a minimum pressure valve 33. The minimum pressure valve 33 can be mounted directly onto the lid 8. De liquid separator 1 is also connected to the environment via a pressure relieve valve 34. In case the pressure inside the liquid separator 1 would be too high, the pressure can escape via this pressure relieve valve 34. This pressure relieve valve 34 can be mounted directly onto the lid 8 or the base 6.

The present invention is by no means limited to the embodiments described as an example and shown in the drawings, but such a liquid separator can be realized in all kinds of variants, without departing from the scope of the invention.

The invention claimed is:

1. A liquid separator comprising:
a housing which comprises an at least partially cylindrical wall defining a separation chamber, closed at one end by a base and at the other end by a lid in which there is a gas outlet for the discharge of the treated gas,
wherein a shield is provided in said separation chamber surrounding the gas outlet in the separation chamber from the lid,
wherein the liquid separator having an inlet for a liquid-gas mixture to be treated, wherein the inlet is located in the lid so that the liquid-gas mixture tangentially enters the separation chamber in the space between the wall and the shield,
wherein the housing wall is made up of a sleeve around which a composite is fitted or wound,
wherein an outer diameter of the lid is smaller than an outer diameter of the cylindrical wall of the housing and/or an outer diameter of the base is smaller than the outer diameter of the cylindrical wall of the housing and the composite is fitted at least partly over or around the lid and base, wherein the inlet is designed as a duct in and through a top portion of the lid in a way such that the liquid-gas mixture entering the separation chamber tangentially enters as a cyclone or vortex-shaped flow to project the liquid-gas mixture against an inner wall of the sleeve, and wherein a cross section of the duct, seen in the flow direction of the liquid-gas mixture, gradually changes from mostly circular to D-shaped and then changes to C-shaped, wherein the opening of the C-shape is facing towards the sleeve and the duct is bent at least at the C-shaped cross-section and follows a shape of the housing.

2. The liquid separator according to claim 1, wherein said composite is made up of glass fiber, aramid or carbon fiber in an epoxy resin matrix and/or that the sleeve is made up of a plastic or polymer such as HDPE.

3. The liquid separator according to claim 2, wherein seals are provided between the base and the lid and the sleeve.

4. The liquid separator according to claim 3, wherein said seals are O-rings.

5. The liquid separator according to claim 1, wherein one or more surface units are provided in the periphery of the lid and/or the base in which or on which the composite is fitted to achieve a rotational connection between the composite and the lid and/or the base.

6. The liquid separator according to claim 1, wherein the outer diameter of the afore-mentioned lid is smaller than the inner diameter of the cylindrical wall of the housing at the end and/or the outer diameter of the afore-mentioned base is smaller than the inner diameter of the cylindrical wall of the housing and the end.

7. The liquid separator according to claim 6, wherein the aforementioned lid and/or base are fixed in the housing with one or more retaining rings, which consist out of one or more parts and which are placed in ring shaped grooves at the inside of the end of the cylindrical wall of the housing.

8. The liquid separator according to claim 1, wherein the base and/or the lid are made of anodized aluminum, stainless steel or a bronze alloy.

9. The liquid separator according to claim 1, wherein the duct is bent into an opening spiral when seen in the flow direction of the liquid-gas mixture.

10. The liquid separator according to claim 1, wherein one end of the duct is located on the side of the lid facing the separation chamber and the other end of the duct is located on the side of the lid which faces away from the separation chamber.

11. The liquid separator according to claim 1, wherein the gas outlet is placed centrally in the lid.

12. The liquid separator according to claim 1, wherein one or more controllers are provided for determining the level of liquid in the housing.

13. The liquid separator according to claim 12, wherein at least one of the aforementioned controllers is designed as a sensor located centrally in the housing or on the inner wall of the housing.

14. The liquid separator according to claim 1, wherein a demister or droplet separator is provided in the housing.

15. The liquid separator according to claim 1, wherein the base is or can be equipped with supports or legs or aids for attaching the liquid separator to a surface or machine.

16. The liquid separator according to claim 1, wherein the liquid separator is provided with a pressure relieve valve which is connected to the lid or to the base.

17. The liquid separator according to claim 1, wherein the liquid separator is provided with a minimum pressure valve which is mounted onto the lid.

18. The compressor installation, wherein the compressor installation comprises at least one liquid separator according to claim 1.

19. The compressor installation according to claim 18, wherein the compressor installation comprises at least one water injected screw compressor element.

20. A liquid separator comprising:
a housing which comprises an at least partially cylindrical wall defining a separation chamber, closed at one end by a base and at the other end by a lid in which there is a gas outlet for the discharge of the treated gas,
wherein a shield is provided in said separation chamber surrounding the gas outlet in the separation chamber from the lid,
wherein the liquid separator having an inlet for a liquid-gas mixture to be treated, wherein the inlet is located in the lid so that the liquid-gas mixture tangentially enters the separation chamber in the space between the wall and the shield,
wherein the housing wall is made up of a sleeve around which a composite is fitted or wound,
wherein an outer diameter of the lid is smaller than an outer diameter of the cylindrical wall of the housing and/or an outer diameter of the base is smaller than the outer diameter of the cylindrical wall of the housing and the composite is fitted at least partly over or around the lid and base,
wherein the inlet is designed as a duct in and through a top portion of the lid in a way such that the liquid-gas mixture entering the separation chamber tangentially enters as a cyclone or vortex-shaped flow to project the liquid-gas mixture against an inner wall of the sleeve,
wherein a cross section of the duct, seen in the flow direction of the liquid-gas mixture, gradually changes from mostly circular to D-shaped and then changes to C-shaped, wherein the opening of the C-shape is facing towards the sleeve and the duct is bent at least at the C-shaped cross-section and follows a shape of the housing,
wherein the liquid separator is provided with a drain for the separated liquid placed in the base or in the wall of the housing near the base, and
wherein the liquid separator is configured to obtain a second separation phase where the gas-liquid mixture is forced to make a bend of 180° as it flows around a free end of the shield.

* * * * *